Patented Sept. 9, 1947

2,427,082

UNITED STATES PATENT OFFICE 2,427,082

PAINT

Paul Zurcher, Ponca City, Okla.

No Drawing. Application June 29, 1942,
Serial No. 449,018

7 Claims. (Cl. 106—263)

My invention relates broadly to surface-coating compositions and to a method of preparing surface-coating compositions. More particularly, it relates to paints, varnishes, enamels, and the like, improved by the addition of a small amount of one or more halogen-bearing monohydric or dihydric ester.

This application is a continuation-in-part of my copending application, Serial No. 333,606, filed on May 6, 1940, which, in turn, is a continuation-in-part of my application, Serial No. 175,775, filed on November 22, 1937.

It has been taught that certain fatty oils or trihydric esters may be chlorinated and added to paints and the like to shorten the drying time and to increase the durability of the paint film. Particular mention is made of linseed, hemp, poppy, tung, cotton, sunflower, and corn oils. The addition of these and similar chlorinated oils to a paint, enamel, varnish, synthetic resin solutions, or other surface-coating composition appreciably hastens the drying time and in certain cases more or less lengthens the life of the paint film; however there are various disadvantages attendant to the use of these compounds. In these paints or enamels the pigment is prone to form a hard sediment on the bottom of the can and a tough skin generally forms on the surface of the material.

In the manufacture of paints, varnishes, and enamels, the formulators strive for ease of application; a smooth, hard, elastic film; resistance to chalking, to checking, to weathering, and to corrosive influences; for good pigment suspension during storage; for good hiding qualities, and the like. In many surface-coating compositions, one or more of these desirable properties are deficient. For instance, a paint may show good resistance to corrosion and good hiding power; but it may be difficult to apply, while its pigment may settle hard in storage. Another paint having good drying characteristics and ease of application may have low durability. Another paint may possess a beautiful finish but may show a tendency to check upon exposure to the atmosphere. A varnish may have good flowing characteristics and be easy to apply but may have a tendency to check and peel because of lack of elasticity. In general, it may be said that most paints, enamels, varnishes, and the like do have certain weaknesses or deficiencies which render them less effective than desirable.

One object of my invention is to provide a paint or enamel having incorporated therein an additive which will reduce or eliminate the defects of the paint or enamel or varnish. More particularly, it is an object of this invention to provide a paint, enamel, varnish, or the like having incorporated therein a small but effective amount of a halogenated ester which will improve the paint or the varnish with respect to its applying, covering, and wearing qualities. More specifically, it is an object of this invention to provide a coating composition treated in such a manner that one or more of the following properties of the composition will be vastly improved. These characteristics are:

Pigment suspension
Body of paint
Ease of application
Brush marks
Drying time
Orange peel
Resistance to checking
Resistance to chalking
Resistance to the attack of harmful gases, liquids, etc.
Even distribution of the material upon the surface
Tough elastic film It is the further object of my invention to provide a method of protectively and decoratively coating or impregnating surfaces in such a manner that the desirable properties of the coating or impregnating material will be enhanced. Further objects and advantages of my invention will be apparent from the following detailed description.

My application, Serial No. 175,775, discloses that adding small amounts of chlorinated organic compound to a paint generally lengthens the life of the paint film by retarding its disintegration.

I have now found that new and beneficial results, more particularly the improvement of a paint in one or more of the above-mentioned desirable properties, may be obtained by the addition to the paint of a small but effective quantity of a halogen-bearing monohydric or dihydric ester. These particular halogen-bearing esters affect the paint differently than chlorine-bearing organic compounds in general; and as a whole, they are much better addition agents.

The monohydric esters of use in the practice of this invention may have the formula $$XRCOOR_1X_1$$

where R and $R_1$ represent any radical, either aliphatic, aromatic, carbocyclic, or heterocyclic and where X and $X_1$ represent a total of one or more halogen atoms. The halogen atom or atoms may be present in either one or both of the radicals R and $R_1$. The number of halogen atoms in the ester may vary from one to the number necessary to replace all the hydrogen atoms.

Similarly, I may use dihydric esters represented by the general formula $$XR \begin{matrix} COOR_1X_1 \\ COOR_2X_2 \end{matrix}$$

where R, $R_1$, and $R_2$ may be any of the above-mentioned organic radicals, and $X_1$, $X_2$, and $X_3$ total one or more of the same or different halogen atoms. The halogen atoms or atom may be present in any one of the organic radicals, in two of the radicals, or in all of the radicals. Thus the ester may contain one halogen atom or may be further halogenated to the degree at which all hydrogen atoms have been replaced by halogen atoms.

The radicals designated R, $R_1$, and $R_2$ may be saturated or unsaturated.

This invention must be regarded in two phases. For general improvement of the paint with regard to brushing characteristics, can stability, toughness, elasticity of the film, resistance to chalking, better penetrating characteristics, and enhanced hiding power, from .02 per cent, or even lesser amounts, to 5 per cent of the halogenated esters may be added depending upon the needs of the particular paint. In most instances when the paint is to be applied to a nonmetallic surface such as wood, fiber, brick, cement, and similar nonmetallic substances, very small proportions of halogenated esters, less than 1 per cent, are entirely adequate to improve these particular desirable characteristics of the paint.

The second phase of this invention involves the use of halogenated esters to inhibit a paint to be applied to a metallic surface to lengthen the protective life of the film and to protect the metal against corrosion. I have found that in the case of many paints there is a minimum critical point below which the percentage of halogenated esters in a paint deleteriously affects the resistance the paint film has to corrosion rather than increases the resistance which the paint film has to such corrosion. It is impossible to definitely state the minimum critical point, but it is approximately 1 per cent based on the weight of the finished paint. In a paint to be used on metallic surfaces which are subjected to weathering conditions there is a variable minimum critical point below which the percentage of halogenated ester should not be added. The amount of the ester to be added must necessarily depend upon various factors which are different in each paint, varnish, enamel, etc. Among these factors are the type of paint, the weight of the pigment in the particular paint, the particular vehicle of the paint or varnish, the amount of pigment in the particular paint, the particular ester to be added to the paint, method of application of the particular paint, that is, whether it is to be sprayed or brushed, etc. As a generality, it may be stated that for most paints the optimum amount of esters, that is, the range above the minimum critical point and in which the best results will be obtained, will range between one per cent and two per cent based on the weight of the paint. When the halogen-bearing esters, particularly chlorine-bearing esters, are added to paints in amounts within this range, the life of the paint film is increased considerably over that of a film containing no halogen-bearing ester or lesser or greater amounts of halogen-bearing ester than this range.

There is a maximum beyond which the percentage concentration of the esters may not be increased without deleteriously affecting the properties of the paint. If the paint or varnish comprises a large proportion of nonvolatile vehicles such as linseed oil, tung oil, synthetic resins, and the like, a higher maximum amount of halogenated esters may be added to the paint than to a paint of high pigment content. It is possible by easily conducted tests to ascertain the maximum amount of the particular ester which may be added to the specific paint. In like manner, it is possible, by conducting suitable experiments, to determine the critical range within which the anticorrosive properties of a particular paint may be improved by the addition of the halogenated esters. By simple experimentation, it is possible to know which of the various esters and how much of the particular esters must be added to a specific paint in order to determine which specific embodiment of this invention is most suitable in the instance.

In general, the halogenated esters employed should have a vapor pressure at 170 degrees Fahrenheit of less than atmospheric pressure esters which have vapor pressures more than atmospheric at this temperature are usually too volatile to produce the improving effect. I am unable to explain why the halogenated mono- and dihydric esters behave in this manner, nor do I know what is the reason these esters will improve the general characteristics of a paint. It may in part be due to the effect the halogenated esters have upon the surface tension of the paint or it may be due to some chemical or other physical action. Irrespective of the cause, these particular compounds remarkably improve the particular paint or varnish or the like to which they are added and produce paints having characteristics far superior to paints to which have been added various other chlorinated materials, and I base my invention and seek claims upon the results which I have observed proving the various esters herein mentioned are effective paint additives.

It is essential that these additives be soluble in the paint composition. By the term "soluble," as it is used here and in the appended claims, I refer to the physical and chemical state in which the halogenated monohydric and dihydric esters are dissolved, suspended, colloidally dispersed, or miscible in the paint or paint vehicle in such a manner that the esters are present homogeneously throughout the paint.

By the term "paint" used in this application and the appended claims, I mean those film-forming, surface-coating, and impregnating compositions of matters comprising a pigment, a vehicle with or without an additional drying agent; those compositions comprising a vehicle and resin; and similar compositions. These compositions are generally referred to as paints, enamels, and varnishes. Paints in general may be improved in regard to pigment suspension both in the can and in the drying film of paint, body of the paint, ease of application, reduction in brush marks, accelerated drying time, resistance to orange peel, resistance to checking, resistance to weathering, resistance to the attack of harmful gases, liquids, and vapors, and in other respects. The varnishes, oleoresinous materials, or synthetic resin solutions which may comprise oil varnishes, synthetic resin solution varnishes, or spirit varnishes are vastly improved in respect to toughness of the film, elasticity of the film, resistance to checking, resistance to weathering, ease of application, chalking, and wearing characteristics by the addition of small but effective amounts of halogenated monohydric and dihydric esters.

By the term pigments, I mean substances which are generally considered insoluble in the vehicle as distinguished from dyes which are generally considered soluble.

The following is a list of esters selected from the group consisting of monohydric and dihydric esters which may be halogenated, and more particularly chlorinated, to produce a compound within the scope of this invention and which remarkably improve the paint or varnish or surface coating composition in the manner herein described. Each of these halogenated compounds has been added to a paint, varnish, or enamel in varying amounts to produce a paint, varnish, or enamel showing remarkably improved storage, applying, protecting, and aging characteristics.

I. Monohydric esters
  A. Aliphatic
    1. Methyl stearate
    2. Ethyl acetate
    3. Propyl laurate
    4. Ethyl caproate
    5. Butyl formate
    6. Amyl lactate
    7. Methyl oleate
    8. Ethyl acrylate
    9. Butyl-acetyl recinoleate
  B. Aromatic, heterocyclic, and carbocyclic
    1. Ethyl cinnamate
    2. Phenyl acetate
    3. Benzyl stearate
    4. Resorcinyl formate
    5. Propyl naphthoate
    6. Methyl-pyridine monocarboxylate
    7. Tetramethylene acetate
II. Dihydric esters
  A. Aliphatic
    1. Ethyl malonate
    2. Butyl succinate
  B. Aromatic
    1. Diethyl phthalate
    2. Dibutyl phthalate To further describe this invention, various examples are given below which may be studied in connection with the above disclosure but which should be considered merely as examples and not as limitations of this invention.

*Example 1.*—Three metallic panels were coated with a paint composed chiefly of red lead and linseed oil. One panel contained the paint without any addition agent. A second panel contained the paint and 0.5 per cent by weight of methyl dichlorostearate, a chlorinated aliphatic ester. A third test panel was covered with the paint admixed with 1 per cent by weight of methyl dichlorostearate. The test films were exposed uniformly to the action of ultraviolet light and to an intermittent spray of water in an accelerated weathering machine under conditions which would correspond to approximately 5 years' exposure to the atmosphere.

The panel covered with paint alone, without any addition agent, showed some rusting. The panel covered by the paint containing 0.5 per cent of methyl dichlorostearate had approximately twice the amount of rust as the panel covered by the paint without any addition agent. The third panel which contained 1 per cent methyl dichlorostearate in the paint was without a trace of rust.

*Example 2.*—Tests were made with green paint. Three test panels were employed as in the case above described. The same base paint was used on all three panels. One panel was coated with the base green paint alone. The second panel was coated with the base paint plus 0.5 per cent by weight of methyl dichlorostearate. The third test panel was covered with the base paint with 1 per cent of methyl dichlorostearate. These panels were subjected to ultraviolet light and an intermittent spray of water to give an exposure to correspond to a period of five years of outside weathering. In this case, as in the foregoing, the paint containing 0.5 per cent methyl dichlorostearate was well advanced in its decay with increased rusting as compared with the base paint alone, while the panel to which 1 per cent by weight of methyl dichlorostearate was added was perfectly preserved, rusting not having even started.

*Example 3.*—A linseed oil base white paint for general outdoor use was selected to compare the effect of the addition of chlorinated tung oil and chlorinated esters. One per cent chlorinated tung oil was added to a sample of this white paint. One per cent methyl dichlorostearate was added to another sample of this paint. The hiding power of the paint with the one per cent methyl dichlorostearate was noticeably better than the hiding power of the paint with one per cent chlorinated tung oil. After exposure to the atmosphere for 472 days, panels covered with paints containing no addition agents were rusted; but panels covered with paints containing one per cent chlorinated tung oil and chlorinated methyl dichlorostearate were not rusted. Samples of paints containing chlorinated tung oil and samples of paints containing methyl dichlorostearate were placed in cans to determine the storage characteristics of the paints. After being stored for the same length of time and under the same circumstances, the paint-containing cans were opened to determine the change in the paints. On the surface of the paint containing one per cent methyl dichlorostearate, only a thin skin of film had formed, which was easily removed; and the body of the paint was easily stirred up to form a homogeneous mass. This was a great improvement over the can stability of the original paint which, during a short storage time, was found to have settled out the pigment and formed a tough film upon the surface of the paint. In the container of the paint in which chlorinated tung oil had been incorporated, a tough, wrinkled, hornlike skin covered the surface. The pigment had settled completely, and in general the paint was unfit for use. The chlorinated tung oil deleteriously affected the color of light-colored paints. One per cent chlorinated tung oil appreciably darkened the paint, which was not unexpected as all halogenated double and triple bond-containing compounds are very dark in color.

*Example 4.*—For another test similar to the one described above, a white enamel, the composition of which has been kept secret by the paint manufacturer, was chosen as the base for the paint composition to be tested. To this paint was added one per cent methyl dichlorostearate to form one sample to be tested. One per cent chlorinated tung oil was added to a like amount of the same white enamel. Both the sample of white paint into which had been added one per cent methyl dichlorostearate and the sample to which had been added one per cent chlorinated tung oil were easier to apply with a brush than was the untreated enamel. Small steel panels were painted, one panel with enamel containing one per cent chlorinated tung oil and the other panel with enamel containing one per cent methyl dichlorostearate. After exposure to the atmosphere for 214 days, the enamel containing the methyl dichlorostearate was in better condition and had protected the steel panel against rust much better than had the enamel containing the chlorinated tung oil. More noticeable, however, was the effect of the two additives upon the can stability of the enamels. The additives affected the enamel in opposite ways, one beneficially, the other deleteriously. A hard skin had formed upon the surface of the original paint after it had been stored for a considerable time. No skin had formed on the surface of the enamel containing one per cent methyl dichlorostearate although it had been stored for the same length of time and in the same place in which the can containing the original paint had been stored. In the can containing the enamel to which had been added one per cent chlorinated tung oil, a thick skin grew within twenty-four hours on the surface of the sample although the container had been airtight and stored in exactly the same amounts and under exactly the same conditions that the unblended sample and the sample containing one per cent methyl dichlorostearate had been stored. This skin was removed, and within twenty-four hours another thick skin appeared which turned into a sold, hornlike mass after a few days although the can was airtight and had been kept in the same place the other samples had been kept.

*Example 5.*—A tank white paint was selected as the basic material for the paint composition. This paint has the following formula:

|  | Per cent |
|---|---|
| Vehicle (alkyd resin solution, 100 per cent) | 65 |
| Pigment (titanium dioxide, 85 per cent; zinc oxide, 15 per cent) | 35 |

An objectionable characteristic of this paint is its very rapid setting. It is almost impossible to brush it out smoothly before it becomes very viscous and set. A steel panel was coated with this paint by means of a brush. The surface of the paint on the panel was rough and uneven. Not only was the paint hard to apply but it also lacked hiding power.

One per cent ethyl-chlorocaproate was added to a sample of this paint. The paint containing the ethyl-chlorocaproate was vastly improved in its brushing characteristic. A steel panel similar to the above-mentioned panel was painted with this paint. The paint was not viscous while brushing and was more smoothly applied and had considerably more hiding power. The surface of the paint on the painted panel was smooth, and the hiding was even.

*Example 6.*—A galvanized iron primer, the formula of which is kept secret by the manufacturer, was used as the base paint in this test. This paint was difficult to brush out. It was impossible to apply a smooth film of this paint upon the panel. The painted surface was very uneven to the touch. To this paint 2.5 per cent ethyl-chlorocaproate was added. The brushing and flowing characteristics of this paint were much better than those of the unblended paint. Steel panels painted with the original paint and the improved paint clearly indicated the addition of 2.5 per cent ethyl-chlorocaproate produced a paint having a smoother, tougher coat.

*Example 7.*—The paint selected to be used as the basic material for this test was a red enamel. Its formula is as follows:

|  | Per cent |
|---|---|
| Vehicle (alkyd resin solution, 100 per cent) | 88 |
| Pigment (pure toluidine red, 100 per cent) | 12 |

This enamel had inferior brushability and inferior hiding power. A panel was painted with this enamel and clearly showed the results of the poor brushability and the inferior hiding power of the enamel.

To a sample of this enamel one per cent butyl-acetyldichlororicinoleate was added. The enamel blended thus flowed out easily, had superior brushability, and proved to have a hiding power much improved over that of the original enamel.

*Example 8.*—A white tank paint had the following formula:

|  | Per cent |
|---|---|
| Vehicle (linseed oil modified, glycerol esters, 43 per cent; japan drier, 10 per cent; mineral spirits, 47 per cent) | 73 |
| Pigment (titanium dioxide, 100 per cent) | 27 |

This paint was very difficult to brush and had uneven hiding power. These objectionable characteristics were eliminated by the addition of one per cent betachloroethyl acetate. The blended paint was much easier to apply with a brush, and the coating proved to be smooth, tough, and to have even, improved hiding power.

*Example 9.*—For this test an exterior white paint of a different source but of similar composition was used. This paint too was difficult to apply with a brush and had poor hiding characteristics.

One per cent amylchlorolactate added to this paint improved its flowing and hiding characteristics as compared with the original unblended paint.

*Example 10.*—For this test a primer-surfacer paint was selected. It had the following composition:

|  | Per cent |
|---|---|
| Vehicle (alkyd resin solution, 100 per cent) | 50 |
| Pigment (iron oxide, 6.52 per cent; lithopone, 54.36 per cent; kaolin, 13.04 per cent; blanc fixe, 26.08 per cent) | 50 |

This surfacer was very difficult to apply, being stiff in the brush and lacking good flowing characteristics.

One per cent ethyl-bromomalonate was added to this paint. These two paints were tested in the same manner that the paints were examined in the above examples.

The paint containing one per cent ethyl-bromomalonate was easy to apply with a brush, had very fine flowing characteristics, and there was no apparent reduction in body. The can stability of this primer was greatly improved by the addition of one per cent chlorinated ester. Normally the pigment of this paint settles in the can after a few days necessitating prolonged stirring before it is in condition for application.

*Example 11.*—For this test a black enamel was selected. The enamel had the following composition:

| | Per cent |
|---|---|
| Pigment (carbon black, 100 per cent) | 3.6 |
| Vehicle (vegetable oils, 40 per cent; resins and dryers, 60 per cent) | 96.4 |

This paint is very thin, lacking in body. One and one half per cent ethyl-chlorocinnamate was added to this enamel and tested in the same manner in which the other paints were tested. The blended paint had a better body, it was not as thin, and was improved in respect to hiding power as compared to the original black enamel.

The above examples are but a few of the many tests that have been made upon various paints, enamels, and varnishes to which have been added a small amount of methyl dichlorostearate, ethyl-chlorocaproate, butyl-acetyldichlororicinoleate, beta-chloroethylacetate, ethylbromomalonate, ethyl chlorocinnamate, and other halogenated esters. All of these tests show an improvement in brushability, flowing characteristics, hiding power, and can stability in addition to the important and perhaps primary property of increased weathering resistance.

An improved paint or varnish for use on non-metallic surfaces such as wood, fiber, brick, cement, or where weathering or corrosion is not a factor to be considered, may be prepared by the addition of less than one per cent of halogenated esters. It will be noted that the addition of less than one per cent methyl dichloro-stearate and other halogenated esters deleteriously affected the antirusting characteristics of certain paints, while from approximately one per cent to somewhat less than five per cent added methyl dichloro-stearate and other halogenated esters inhibited the paint against corrosion. If the paint or varnish is to be used for inside paints, enamels, or varnishes or under conditions where weathering or corrosion is not a factor, it is possible to beneficially affect the other properties of the paint or varnish by the addition of less than one per cent of the halogenated esters. For example, the can stability of a paint is vastly improved by adding .5 per cent methyl dichlorostearate or other chlorinated or halogenated esters. The hiding power and the flowing properties of the paints are likewise beneficially affected. The elasticity and durability of the varnish film is improved. The beneficial effect of smaller amounts, that is, amounts below the percentage found necessary to improve the resistance of the paint to weathering and corrosion, of these halogenated esters is shown by the following examples:

*Example 12.*—For this test a flat wall paint was selected. It had the following formula:

| | Per cent |
|---|---|
| Vehicle (resin, 14.7 per cent; vegetable oils, 34.1 per cent; drier, 1.2 per cent; volatiles, 50 per cent; total 100 per cent) | 31 |
| Pigment (lithopone, 87.5 per cent; Asbestine, 12.5 per cent; total, 100 per cent) | 69 |

This paint was tinted with a trace of ochre and chrome yellow.

In the tests this paint was very difficult to apply because it was very thick. Great force had to be exerted in brushing, and it was very difficult to apply the paint without leaving heavy brush marks.

One half of one per cent methyl dichlorostearate was added to this paint. This blended paint was an easily worked product, having good flowing and easy brushing properties, and the coating showed no brush marks.

*Example 13.*—For this test an outside white paint, having the following formula, was selected:

| | Per cent |
|---|---|
| Vehicle (pure linseed oil, 90 per cent; japan drier, 10 per cent) | 37 |
| Pigment (Titanox, 70 per cent; zinc oxide, 30 per cent; total, 100 per cent) | 63 |

When applied to a wooden surface by means of a brush, this outside white paint showed heavy brush marks and did not penetrate the surface of the wood as is desired.

The addition of 0.5 per cent methyl dichlorostearate produced a paint having improved flowing characteristics. When applied to a wooden surface with a brush in the manner in which the original sample was applied, the brush marks were reduced, the hiding power was vastly improved, and there was a much better distribution of the pigment upon the surface of the wood. The vehicle readily penetrated the wood, and the drying time was shortened.

It is possible that one single monohydric or dihydric halogenated ester will correct only one defect of a paint, such as deficiency in brushing, flow, adhesion, or settling in the container. Another monohydric or dihydric halogenated ester may favorably influence another property of the same paint. By adding two monohydric or dihydric halogenated esters to a paint, enamel or varnish, its quality may be improved simultaneously in different directions. For example I may add to an enamel 0.2 per cent dichloroethyl caproate plus 0.5 per cent monobromoethyl cinnamate or to a varnish 0.7 per cent monochloropropyl malonate, 0.4 per cent iodomonobutylphthalate or any other combination that will produce an increased beneficial effect on the properties of a coating composition. Any beneficial combination of two or more monohydric or dihydric halogenated esters may be easily found by a few trials.

The combined action on paints, enamels, and varnishes of an amine and a halogenated compound, particularly chlorinated compounds, has been described in my copending application, serial No. 368,277, filed December 2, 1940.

It will be understood that such features of such combinations are of utility and may be employed with references to other features and subcombinations. This is contemplated and is within the scope of my claims. It is further obvious that various changes may be made in details within the scope of my claims without departing from the spirit of my invention. It is, therefore, to be understood that my invention is not to be limited to the specific details shown and described but is to be limited only by the scope of the appended claims.

Having thus described my invention, I claim:

1. A paint comprising a vehicle and methyl dichlorostearate in amounts, less than 5%, sufficient to improve the flowing and brushing qualities of the paint, but insufficient to appreciably adversely affect its drying qualities.

2. A method of improving the brushing qualities of a paint comprising adding to the paint a chlorine-bearing monohydric ester, said ester present in amounts, less than 5%, which will improve flowing and brushing qualities, but will not appreciably adversely affect drying and having a vapor pressure less than atmospheric at 170° F.

3. A method of improving the brushing qualities of a paint comprising adding to the paint a halogen-bearing ester selected from the group consisting of chlorine-bearing monohydric esters and halogen-bearing dihydric esters, said ester present in amounts, less than 5%, which will improve flowing and brushing qualities but will not appreciably adversely affect drying and having a vapor pressure of less than atmospheric at 170° F.

4. A paint comprising a vehicle and a chlorinated mono ester of a monocarboxylic acid and a monohydric alcohol in an amount, less than 5%, sufficient to improve the flowing and brushing qualities of the paint but insufficient to appreciably adversely affect its drying qualities.

5. A method of improving the brushing qualities of a paint comprising adding to the paint ethyl chloro caproate, said material present in amounts, less than 5%, which will improve flowing and brushing qualities but will not appreciably adversely affect drying and having a vapor pressure of less than atmospheric at 170° F.

6. A method of improving the brushing qualities of a paint comprising adding to the paint ethyl bromo malonate, said material present in amounts, less than 5%, which which improve flowing and brushing qualities but will not appreciably adversely affect drying and having a vapor pressure of less than atmospheric at 170° F.

7. A method of improving the brushing qualities of a paint comprising adding to the paint a halogen-bearing dihydric ester, said ester present in amounts, less than 5%, which will improve flowing and brushing qualities but will not appreciably adversely affect drying and having a vapor pressure of less than atmospheric at 170° F.

PAUL ZURCHER.

REFERENCES CITED

The following references are of record in the file of this patent:

UNITED STATES PATENTS

| Number | Name | Date |
|---|---|---|
| 2,318,684 | Gaylor | May 11, 1943 |
| 2,201,484 | Farrington | May 21, 1940 |
| 2,186,917 | Gaylor | Jan. 6, 1940 |
| 2,115,708 | Dreyfus | May 3, 1938 |
| 2,104,408 | Wiezevich | Jan. 4, 1938 |

FOREIGN PATENTS

| Number | Country | Date |
|---|---|---|
| 459,719 | Great Britain | Jan. 8, 1937 |